LOGIC CIRCUIT

Filed July 5, 1963

2 Sheets-Sheet 1

INVENTOR.
HENRY S. MIILLER
BY John V. Regan

INVENTOR.
HENRY S. MIILLER
BY John V. Regan
Attorney

United States Patent Office 3,249,765
Patented May 3, 1966

3,249,765
LOGIC CIRCUIT

Henry S. Miiller, Yardley, Pa., assignor to Radio Corporation of America, a corporation of Delaware
Filed July 5, 1963, Ser. No. 292,914
10 Claims. (Cl. 307—88.5)

This invention relates to logic circuits and, in particular, to logic circuit arrangements which employ a threshold element both for performing logic and for suitably terminating a number of input transmission lines.

As the need for higher and higher speed has arisen in information handling apparatus, digital computers for example, it has been found desirable to use transmission lines to convey information signals between various circuits. In fact, ordinary signal lines have many of the characteristics of transmission lines at high operating speeds. As is known, transmission lines hould be terminated in their characteristic impedance if harmful reflections and possible ringing in the lines are to be avoided.

A problem often arises in high speed logic circuits when it becomes necessary to supply information signals from a number of different sources to a common junction by way of separate transmission lines. The driven logic circuit connected at the common junction must be one capable of performing the desired logic function. It also should provide a proper termination for the lines. If the impedance of the driven circuit or element is too high, the lines may be improperly terminated to such an extent that reflections and ringing may occur therein. On the other hand, if the impedance of the driven logic circuit, or element, is too low, it may not be possible to develop a sufficient voltage for driving other logic circuits or elements.

It is one object of this invention to provide improved means for terminating signal lines in logic circuit arrangements.

It is another object of this invention to provide improved means operative both to perform logic and to suitably terminate a number of transmission lines.

It is still another object of this invention to provide a flexible logic element which may be driven from transmission lines and which properly terminates the transmission lines.

According to the invention, a number of transmission lines are connected to receive information signals at their input ends. Each of the lines is terminated at its output end in the characteristic line impedance by separate resistance means. A threshold element is connected in common to the resistance means and receives a current determined by the number of applied information signals. The threshold element is one having a volt-ampere characteristic defined by first and second regions of variable current and a third, intermediate region of substantially constant current.

The threshold element or device may preferably be either a tunnel resistor or a tunnel rectifier, also known as a backward diode. The volt-ampere characteristics of these threshold devices have first and second regions of substantially constant voltage for different ranges of current, and a third, intermediate region of substantially constant current over a relatively large range of voltage values.

In the accompanying drawing, like reference characters denote like components, and:

Figures 1, 2, 3, 4, 5:
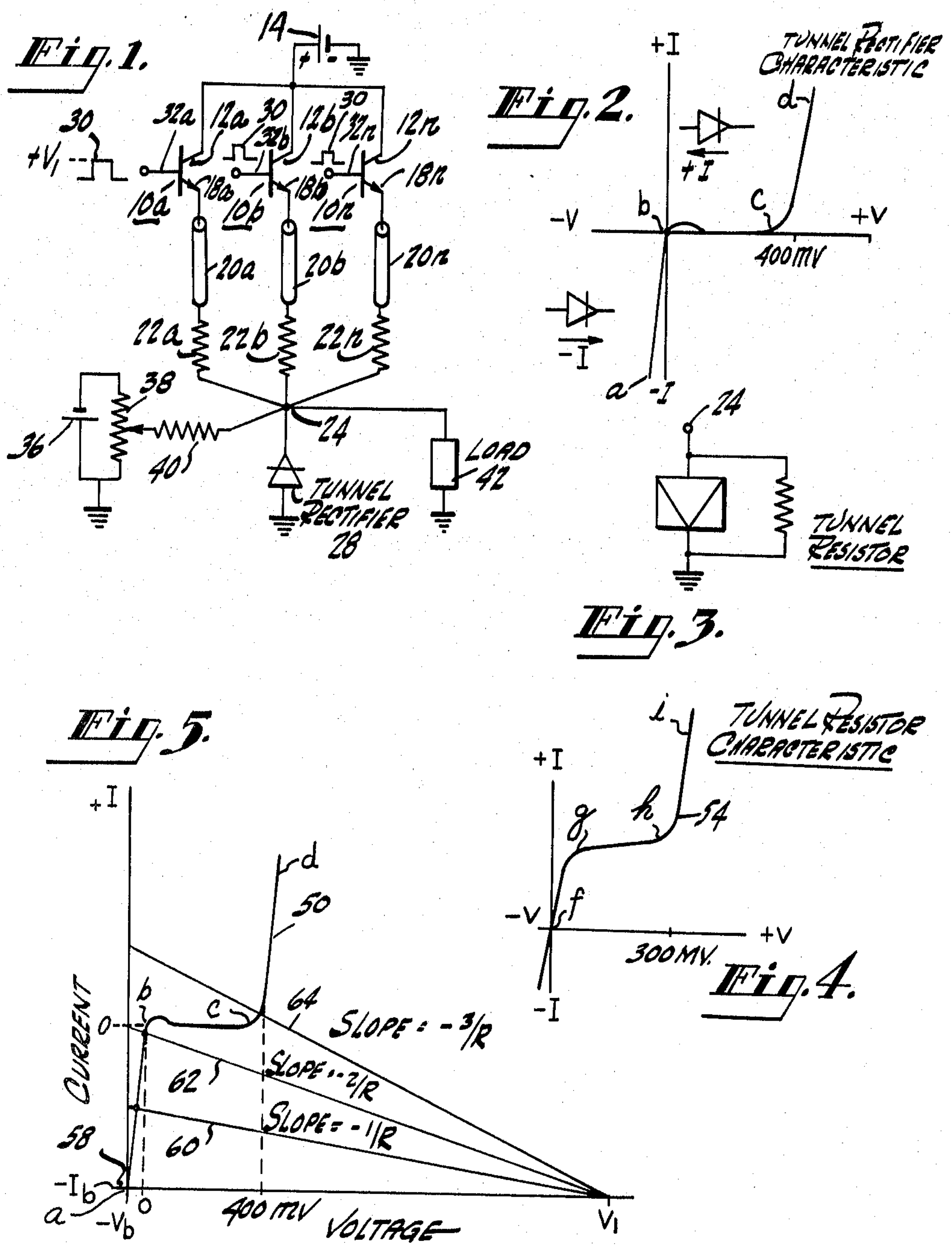
FIGURE 1 is a schematic diagram of a logic circuit arrangement according to the invention.
FIGURE 2 is the volt-ampere characteristic of one type of tunnel rectifier.
FIGURE 3 is the symbol for a tunnel resistor, which device may be substituted for the tunnel rectifier in the FIGURE 1 arrangement.
FIGURE 4 is a typical volt-ampere operating characteristic for one type of tunnel resistor.
FIGURES 5, 6 and 7 are tunnel rectifier operating characteristics with load lines drawn thereon for different conditions of quiescent bias current and signal amplitude.

In FIGURE 1, a number of transistors **10*a*, 10*b* . . . 10*n* of like conductivity type are connected in the common collector configuration. The collectors 12*a* . . . 12*n* are connected together and to the positive terminal of a source of bias, illustrated as a battery 14. The negative terminal of battery 14 is returned to a point of reference potential, indicated schematically by the conventional symbol for circuit ground. Accordingly, the transistors 10*a* . . . 10*n*** operate as emitter followers. An emitter follower, as is known, can provide current and power gain at relatively low voltage swings, which makes an emitter follower a desirable device for transmitting information signals to remote points by way of transmission lines.

The emitter electrode **18*a* . . . 18*n* of each of the transistors is connected to the input, or sending end of a different transmission line 20*a* . . . 20*n*, respectively, and a different resistance element 22*a* . . . 22*n* is connected between the output end of each of the lines 20*a* . . . 20*n* respectively, and a common junction 24. These resistance elements are chosen in value so that the lines 20*a* . . . 20*n*** are terminated approximately in their characteristic impedance.

A threshold element, illustrated as a tunnel rectifier 28, is connected between the common junction 24 and circuit ground. Depending upon the particular logic function to be performed by the circuit arrangement, a quescent bias current may be supplied to the tunnel rectifier 28 in the absence of input signals 30 applied between the base **32*a* . . . 32*n* of any of the transistors 10*a* . . . 10*n* and circuit ground. This bias current may be provided by a battery 36 having a resistor 38 connected in parallel therewith and having the positive terminal of the battery 36 connected to ground. A resistor 40 is connected between common junction 24 and a sliding tap on resistor 38. The value of the latter resistor 40 is selected to be high relative to the characteristic impedance of the transmission lines 20*a* . . . 20*n* so as to provide a constant current bias. An output load 42 is connected at the common junction 24**.

A typical volt-ampere characteristic of a tunnel rectifier is illustrated by the curve 50 in FIGURE 2. The particular voltage values given are for a germanium type device. A discussion of tunnel rectifiers and some of their characteristics appears at page 14 of the RCA Tunnel Diode Manual, Technical Manual TD–30, published in 1963. For present purposes, it is sufficient to note that the volt ampere characteristic 50 of a tunnel rectifier has a first region *ab* of substantially constant voltage of low value in which the current through the rectifier may vary over a wide range of values in a first direction, a second region *cd* of substantially constant voltage of relatively higher value in which the current may vary over a wide range of values in the opposite direction, and a third, intermediate region *bc* of relatively constant current, substantially zero, over a wide range of voltage values.

The resistance of the tunnel rectifier 28 in the regions *ab* and *bc* varies depending upon the current, but in any case is only on the order of a few ohms in these two regions. The resistance in the region *bc* is quite high but, as will be discussed, the rectifier is not operatively biased in this region. Accordingly, the rectifier 28 may be considered to be a very low resistance device. It has been found in practice that the resistance of the rectifier 28 is too small to produce any appreciable reflections in the transmission lines 20$a$ . . . 20$n$ when the values of the terminating resistors 22$a$ . . . 22$n$ are chosen to be equal to the characteristic line impedances. One could, of course, take into consideration the small resistance of the rectifier 28 in selecting the values of the terminating resistors 22$a$ . . . 22$n$ so that the transmission lines 20$a$ . . . 20$n$ were terminated almost exactly in the characteristic impedance.

If a resistor were connected between common junction 24 and circuit ground instead of the rectifier 28, and the resistor had a resistance as low as that of the tunnel rectifier, insufficient voltage would be developed across that resistor for driving a load at practical values of input signal voltage. On the other hand, if a large resistor were used, each line and its terminating resistor would be a substantial portion of the termination of each other line, with resulting interaction between the signals in the various lines. Furthermore, the voltage developed across such a resistor would be different for each different number of input signals 30 applied to the transistors 10$a$ . . . 10$n$, whereby the resistor would not function properly to develop an output voltage at either of two distinct values.

Another suitable type of threshold device which may be employed in the FIGURE 1 circuit arrangement is a device illustrated symbolically in FIGURE 3 and known as a tunnel resistor. The characteristics of such a device are described at page 118 of the manual aforementioned. A tunnel resistor may be considered as a parallel combination of a tunnel diode and a resistor of very low inductance. The volt-ampere characteristic of such a device is illustrated in FIGURE 4. It will be noted that the general shape of the characteristic curve 54 bears a similarity to the shape of the characteristic curve 50 of a tunnel rectifier. One distinguishing feature is that the current through the tunnel resistor is not zero in the plateau region $gh$. Another difference between the two devices is that the characteristic curve 54 has a first region $fg$ at relatively low voltage and a second region $hi$ at a higher voltage, in both of which regions current may vary over wide ranges in the same current flow direction.

Consider now the operation of the FIGURE 1 arrangement when the tunnel rectifier 28 is used as the threshold device. Let it be assumed that the input signals 30 vary between a first voltage value at which a transistor is nonconducting, and a second value of $+V_1$ volts. The tap on resistor 38 is adjusted so that a current $-I_b$, in the conventional sense, flows from junction 24 through the rectifier 28 in the absence of any input signals 30 applied at any of the bases 32$a$ . . . 32$n$. The voltage at common junction 24 then is $-V_b$ volts relative to ground. The point 58 on the characteristic curve 50 of FIGURE 5 is the operating point for this condition. In FIGURE 5, the current ordinate and voltage abscissa have been shifted from the position shown in FIGURE 2 to reflect the quiescent bias.

Assume that each of the terminating resistors 22$a$ . . . 22$n$ has a value R ohms. Neglecting the drop across the emitter-base junction of a conducting transistor, load lines for any given input condition may be drawn in FIGURE 5 from a point $+V_1$ volts along the abscissa, where $V_1$ volts is the amplitude of an applied input signal. The slope of a load line is determined by the number of applied input signals. For example, if an input signal 30 is applied at the base 32$a$ of transistor 10$a$ only, then only transistor 10$a$ conducts and the slope of the load line is $-1/R$. If input signals 30 are applied at the inputs of two transistors, the slope of the load line is $-2/R$, etc. It may be seen in FIGURE 5 that the load lines 60 and 62 for one and two applied input signals, respectively, intersect the characteristic 50 in the region $ab$. The voltage across the rectifier 28 for these two conditions is between zero volts and 100 millivolts. The load line 64 for three applied input signals intersects the characteristic 50 in the region $cd$. The voltage across the rectifier 28 then is about +400 millivolts. It may be seen, therefore, that the voltage across the tunnel rectifier has a very low value, relatively speaking, and is substantially constant when input signals are applied to two or less of the transistors, and that the voltage switches to a relatively high value when input signals are applied to three of the transistors. If there are only three transistors, the circuit operates as an AND gate. The load 42, connected in junction 24, is one which responds to this change in voltage. Preferably, the load 42 is one having a high input impedance. A differential amplifier (not shown) having one input terminal connected at common junction 24 is one suitable type of load.

Figure 6:
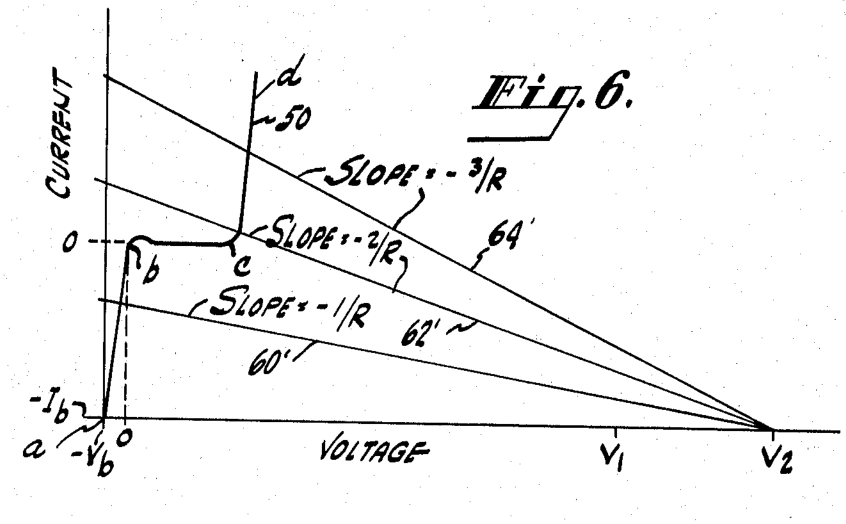
Figure 7:
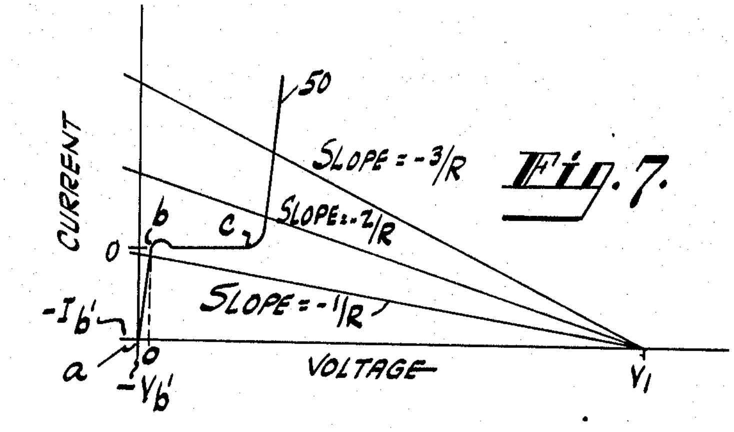

The circuit of FIGURE 1 may be arranged to perform other logic operations, such as the OR function and the MAJORITY function. This may be accomplished either by adjusting the amplitudes of the input signals 30 or by changing the position of the tap on resistor 38. Consider, for example, the condition which arises when the amplitude of the input signal is changed so that the upper value is $+V_2$ volts ($V_2 > V_1$), without changing the quiescent bias. The load lines 60′, 62′ and 64′ then are drawn from a point of $+V_2$ volts along the abscissa, as illustrated in FIGURE 6. The slopes of the latter load lines are the same as the slopes of the load lines 60, 62 and 64, respectively, in FIGURE 5. Load line 60′ intersects the characteristic 50 in the region $ab$ of relatively low voltage, whereby there is little change in voltage across the rectifier 28 in response to an input signal 30 applied to only one of the transistors. Load lines 62′ and 64′ both intersect the characteristic 50 in the region $cd$ of relatively high voltage. Accordingly, the voltage across the rectifier 28 changes from about −0.05 volt to +0.4 volt when input signals 30 are applied to either two or three of the transistors. The circuit then performs the MAJORITY function for the case in which there are only three transistors. That is to say, a large change in voltage appears at common junction 24 whenever input signals 30 are applied to the majority of the transistors. This same result could be achieved by changing the setting of the sliding tap on resistor 38 rather than by changing the amplitudes of the input signals 30. This may be seen in FIGURE 7.

Assume that the tap on resistor 38 is adjusted so that the quiescent current through the rectifier is $-I_b'$, which is less than $-I_b$ in absolute magnitude. It will be noted that the characteristic curve 50 for this condition (FIGURE 7) is not elevated as much from the abscissa as in FIGURE 5. The load lines are drawn from the point $+V_1$ volts along the abscissa. Only the load line having the slope $-1/R$ intersects the characteristic 50 in the low voltage region $ab$. Accordingly, the circuit performs the MAJORITY function for the case of three transistors.

Other logic functions may be performed depending upon the number of transistors, the setting of the slidable tap on resistor 38, and the amplitude of the input signals 30. For example, the circuit arrangement performs the OR function when the slidable tap on resistor 38 is adjusted so that there is no quiescent current through the rectifier 28. The bias condition for this case would be as illustrated in FIGURE 2. Load lines for this condition are not shown in FIGURE 2.

Regardless of the particular logic function to be performed, the quiescent bias current and/or input signal amplitude should be chosen so that none of the load lines intersects the characteristic curve 50 (FIGURES 2, 5, 6 and 7) in the plateau region $bc$. When this condition is met, the voltage across the rectifier 28 always is one or the other of two fairly discrete values, which is desirable in a logic operation. A further reason for avoiding an intersection of a load line with the region $bc$ of the curve 50 is that the resistance of the rectifier 28 is very high in this region, whereby the transmission lines 20$a$ . . . 20$b$ will not be properly terminated in their characteristic impedance.

Operation of the circuit is similar generally when the tunnel resistor of FIGURE 3 is substituted for the tunnel rectifier 28 in the FIGURE 1 circuit. Different values of quiescent bias may be necessary in the latter event from those previously discussed because of the fact that the plateau portion *gh* of the characteristic 54 (FIGURE 4) does not occur at zero current. In fact, quiescent bias current may be unnecessary.

Figure 8:
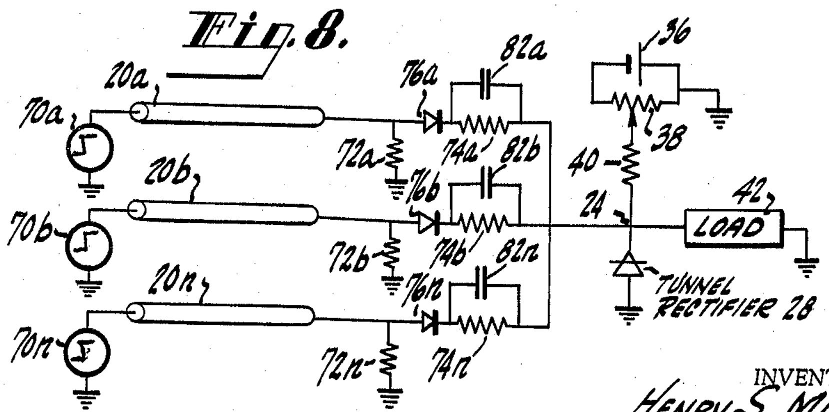
FIGURE 8 is a schematic diagram of another logic arrangement according to the invention.

When the number of transistors or other signal sources is very large, or when the amplitudes of the signals 30 are large in magnitude, a condition may exist where the tunnel rectifier or tunnel resistor is not able to safely carry all of the current. In that event, an arrangement such as the one illustrated schematically in FIGURE 8 may be used. In FIGURE 8, signals are applied at the input ends of the transmission lines 20*a* . . . 20*n* from signal sources 70*a* . . . 70*n*, which may be, for example, the transistors 10*a* . . . 10*n* of FIGURE 1. Separate first resistance elements 72*a* . . . 72*n* are connected between the output ends of the lines 20*a* . . . 20*n*, respectively, and circuit ground. Separate second resistance elements 74*a* . . . 74*n* and unidirectional conducting devices 76*a* . . . 76*n* are serially connected between the output ends of the lines 20*a* . . . 20*n* and a common junction 24. Speed-up capacitors 82*a* . . . 82*n* may be connected in parallel with the resistors 74*a* . . . 74*n*, respectively. The remainder of the FIGURE 8 circuit is the same as that shown in FIGURE 1.

Each of the first resistance elements 72*a* . . . 72*n* and corresponding second resistance elements 74*a* . . . 74*n* are selected in value so that each transmission line is terminated in its characteristic impedance. The second resistors 74*a* . . . 74*n* may be chosen to be larger in value than the first resistors 72*a* . . . 72*n* so that only a small portion of the total line current flows through the second resistors to the tunnel rectifier 28. By this method of terminating the lines in their characteristic impedance, a desired portion of the total line current may be diverted to the tunnel rectifier 28. The operation of the FIGURE 8 arrangement is otherwise substantially the same as that for the other circuits discussed previously and need not be further described. The unidirectional conducting devices 76*a* . . . 76*n* prevent any feedback from the common junction 24 to ground through a terminating network connected at the output of any transmission line which does not receive an input signal.

What is claimed is:

1. The combination comprising:
a number of transmission lines;
means for applying signals selectively between the input ends of said lines and a point of reference potential;
a like number of first resistance elements each connected between the output end of a different one of said lines and said point of reference potential;
a like number of second resistance elements each connected between the output end of a different one of said lines and a common junction, each of said first resistance elements and corresponding second resistance elements having values to terminate the respective transmission line in its characteristic impedance; and
a threshold device connected between said common junction and said point of reference potential and having a volt-ampere characteristic defined by first and second regions of variable current over first and second relatively small ranges, respectively, and a third, intermediate region of substantially constant current over a third, relatively large voltage range.

2. The combination comprising:
a number of transistors each having a base, an emitter and a collector;
a like number of transmission lines each connected at its input end to either one of the emitter and collector of a different one of said transistors;
a like number of resistance elements each connected between the output end of a different one of said transmission lines and a common junction;
a threshold device connected between said common junction and a point of reference potential and having a volt-ampere characteristic defined by first and second regions of variable current and a third, intermediate region of substantially constant current;
bias means connected between said common junction and said point of reference potential;
output means connected at said common junction; and
means for applying signals selectively between the base of each of said transistors and said point of reference potential.

3. The combination comprising:
a number of transistors connected in the common collector configuration;
a like number of transmission lines each having its input end connected to the emitter of a different one of said transistors;
separate resistance means connected at the output end of each of said transmission lines for terminating said lines in their characteristic impedance;
and a threshold device connected in common to each of said resistance means and having a volt-ampere characteristic defined by first and second regions of substantially constant voltage and a third, intermediate region of substantially constant current.

4. The combination comprising:
a number of signal lines each having a characteristic impedance;
means for applying signals selectively at the input ends of said lines;
separate resistance means terminating the output end of each of said lines; and
a threshold device connected in common to each of said resistance means and having a resistance which, together with the resistance of said resistance means, approximates the characteristic line impedance, said threshold device having a volt-ampere characteristic defined by first and second regions of variable current and a third, intermediate region of substantially constant current.

5. The combination comprising:
a number of signal lines each having a characteristic impedance;
means for applying input signals selectively at the input ends of said signal lines;
resistance means connected at the output end of each of said lines and terminating said lines in their characteristic impedance; and
a threshold device connected in common to the output end of each of said lines, said device having a volt-ampere characteristic defined by first and second regions of variable current and a third, intermediate region of substantially constant current.

6. The combination comprising:
a number of signal lines each having a characteristic impedance;
means for supplying input signals selectively at the input ends of said lines;
separate resistance means terminating the output end of each one of said lines in its characteristic impedance;
and a threshold device connected in common to all of said resistance means, said device having a volt-ampere characteristic defined by first and second regions of substantially constant voltage and a third, intermediate region of substantially constant current.

7. The combination comprising:
a number of signal lines each having a characteristic impedance;
separate resistance means connected at the output end of each different one of said lines;
and a threshold device connected in common to each said resistance means and having a volt-ampere characteristic defined by first and second regions of substantially constant voltage and a third, intermediate region of substantially constant current, the resistance of said threshold device in said first and second regions being less than said characteristc impedance and, together with the resistance of each said resistance means, terminating each of said lines in its characteristic impedance.

8. The combination comprising:
a number of signal lines each having a characteristic impedance;
a like number of resistance elements each connected between the output end of a different one of said lines and a common junction, each of said resistance elements having a value to terminate its respective signal line in its characteristic impedance; and
a tunnel rectifier connected at said common junction.

9. The combination comprising:
a number of signal lines each having a characteristic impedance;
a like number of resistance elements each connected between the output end of a different one of said lines and a common junction, each of said resistance elements having a value to terminate its respective signal line in its characteristic impedance;
a tunnel rectifier connected at said junction; and
bias means connected across said tunnel rectifier.

10. The combination comprising:
a number of signal lines each having a characteristic impedance;
a like number of resistance elements each connected between the output end of a different one of said lines and a common junction, each of said resistance elements having a value to terminate its respective signal line in its characteristic impedance; and
a tunnel resistor connected at said common junction.

No references cited.

ARTHUR GAUSS, *Primary Examiner.*
D. D. FORRER, *Assistant Examiner.*